United States Patent [19]

Boles

[11] 3,964,950

[45] June 22, 1976

[54] ADHESION/BONDING DIP FOR TIRE REINFORCEMENT FABRICS

[75] Inventor: Hubert J. Boles, Cuyahoga Falls, Ohio

[73] Assignee: The General Tire & Rubber Company, Akron, Ohio

[22] Filed: Dec. 9, 1974

[21] Appl. No.: 531,111

[52] U.S. Cl. .......................... 156/110 A; 260/29.3; 156/331; 428/395
[51] Int. Cl.² ........................................... B29H 5/02
[58] Field of Search ............... 156/101 A, 331, 335; 260/29.3, 610 R, 610 A; 428/393, 395; 427/381

[56] References Cited
UNITED STATES PATENTS

| | | | |
|---|---|---|---|
| 2,817,616 | 12/1957 | Wolfe | 428/393 |
| 2,991,258 | 7/1961 | Haward et al. | 156/331 X |
| 3,023,197 | 2/1962 | Wheelock | 156/331 X |
| 3,433,664 | 3/1969 | Osborne | 428/393 |
| 3,575,792 | 4/1971 | Blumel et al. | 428/393 |
| 3,857,730 | 12/1974 | Kalafus et al. | 156/110 A |

OTHER PUBLICATIONS

"Qerkadox IPP," Chemistry & Industry, p. XII (in center section) Sept. 29, 1962.

*Primary Examiner*—David A. Simmons

[57] ABSTRACT

Rubber compounds are readily bonded to polyester reinforcing elements, particularly tire cords of polyester fibers, using a one-step dip process in which the dip containing an alkaline aqueous dispersion of a mixture of a major amount by weight of a rubbery vinyl pyridine/styrene/butadiene terpolymer, a resorcinol-formaldehyde reaction product, and a minor amount by weight of a high half-life heat reactable peroxide. Good adhesion of the cords to the rubber compound are obtained with this process.

13 Claims, No Drawings

ADHESION/BONDING DIP FOR TIRE REINFORCEMENT FABRICS

BACKGROUND OF THE INVENTION

The present invention relates to compositions and methods of bonding polyester cord tire reinforcement to the butadiene styrene and/or isoprene rubber of the tire carcass and the improved structure obtained thereby.

In the manufacture of polyester cord reinforced tires, the polyester cord usually is uncoated (Greige) or is coated with a polyepoxide by the cord manufacturer which improves adhesion of the polyester cord to the rubbery body of the tire. After the cord is received from the manufacturer in the form of a fabric, the general practice is to prepare the cord by applying a dip coating of a latex. The dip coating of the polyester fabric used in many cases contains a vinyl pyridine/styrene/butadiene terpolymer and a resorcinol-formaldehyde (RF) resin. With Greige polyester cord this dip also contains a high proportion of a resorcinol based specialty resin. While these specialty resins are quite effective in performing their desired function, they are expensive and often unobtainable in the quantities needed. In addition, their composition is a trade secret and it is impossible to reproduce them without knowning the secret. Attempts at making tires without the use of the specialty resins have resulted in poor adhesion of the rubber to the polyester cord, resulting in the rubber being stripped away from the cord in high speed tests.

Materials other than the specialty resins have been used in the prior art to achieve adhesion in special circumstances. For instance in the prior art manufacture of rubber products based upon ethylene copolymers it was found that RF resin gave poor adhesion of the reinforcing cord to the polyethylene rubber. According to U.S. Pat. No. 3,575,792, Blummell, issued 1971, this problem was solved by the addition of a polydiolefin to the ethylene-propylene polymer of his latex cord dip. In addition, the patent appears to disclose that adhesion is improved by the addition of low half-life peroxides to copolymerize the polydiolefin to the ethylene propylene latex of the cord dip. A similar grafting process is disclosed in U.S. Pat. No. 3,427,183 of Portolani 1969.

SUMMARY OF THE INVENTION

According to the present invention it has been discovered that polyester reinforcing cords can be directly bonded or adhered to cured, rubbery butadiene-styrene based compounds by first dipping the cords in a dip containing an aqueous alkaline dispersion of a mixture of a rubbery vinyl pyridine terpolymer, a resorcinol-formaldehyde resin and a minor amount by weight of a heat activatable peroxide, drying the same, and combining said dipped and dried element with a vulcanizable conjugated diene rubber compound such as a butadiene-styrene rubber compound and vulcanizing the same.

Polyester reinforcing cords treated in this fashion exhibit high rubber to cord adhesion values. Also, aged polyester reinforcing cords retain a major amount of their original rubber to cord adhesion values.

DISCUSSION OF DETAILS AND PREFERRED EMBODIMENTS

In the present application the term "cords" is intended to include reinforcing elements used in rubber products including fibers, continuous filaments, staple, tow, yarns, fabric and the like, particularly cords for use in building the carcasses of tires such as truck tires. The polyesters used to make the cord are linear high molecular weight polyesters usually made by the condensation of $\alpha\omega$-glycols and dicarboxylic acids or esters. These polyester fibers and the like may be oriented and can have number average molecular weights up to about 60,000 and melting points of up to about 300°C. Preferably, these polyesters exhibit substantial crystallinity, up to as much as about 50 percent, usually 38–45 percent, high strength and high tenacity. Also, preferred, are the polyesters in which the fiber is composed of at least 80 percent by weight of an ester of a dihydric alcohol and terephthalic acid such as poly-(ethylene terepthalate). Examples of such polyesters are the high molecular weight polymers obtained from polyethylene glycols and the aromatic dicarboxylic acids, e.g., the high molecular weight condensation product obtained from ethylene glycol and terephthalic acid known as polyethylene terephthalate. Other polyesters which may be used are poly(ethylene oxybenzoate); polypivalalactone; terepolymers from dimethyl phthalate, dimethyl isophthalate and ethylene glycol; polyesters having at least two different repeating units from ethylene terephthalate, p-trimethylene oxybenzoate, and ethylene-1,4-diphenoxy butane-4,4'-dicarboxylate; poly(ethylene terephthalate-isophthalate); poly(1,4-cyclohexylenedimethylene terephthalate); and the like and mixtures thereof. Suitable polyester reinforcing elements are commercially available under the trademarks "Dacron" (du Pont), "Fortrel" (Celanese) and "Vycron" (Beaunit Corporation). These high molecular weight linear polyesters are well known and can be made by methods known to the art. For example, the preparation of polyesters is shown by U.S. Pat. Nos. 2,465,319; 2,965,613 and 2,901,466. A detailed discussion of polyesters such as polyester cords used in the manufacture of tires and other adhesive dips for the same is shown by "Mechanics of Pneumatic Tires," Clark, National Bureau of Standards Monograph 122, U.S. Department of Commerce, issued November, 1971, pages 238 to 241 and 279 to 290. Other references disclosing the preparation of polyesters useful for making filaments, fibers, cords and so forth and which can be used to make various products are:

A. "Encyclopedia of Polymer Science and Technology," Volume 11, 1969, Interscience Publishers, a division of John Wiley & Sons, Inc., New York, pages 1–41;
B. "Encyclopedia of Chemical Technology," Kirk-Othmer, Second Edition, Volume 16, 1968, Interscience Publishers, a division of John Wiley & Sons, Inc., New York, pages 143 to 159; and
C. "Polysters," Korshak et al, 1965, Pergamon Press Inc., New York, pages 384 to 415.

The type of rubber latex used in the tire cord dip bath of this invention is a latex of a copolymer of a vinyl pyridine and a conjugated diolefin having 4 to 6 carbon atoms. The rubber latex is of the type described in U.S. Pat. No. 2,561,215 and comprises an aqueous dispersion of a terpolymer of 50 to 95 percent by weight of a conjugated diolefin having 4 to 6 carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl-2-vinyl pyridine.

In practicing this invention, it is usually preferred to use a latex of a copolymer of from about 60 to 80 percent by weight of 1,3-butadine, 10 to 30 percent by weight of styrene and 10 to 30 percent by weight of 2-vinyl pyridine, the percentage based on the weight of the three recited components. The Mooney viscosity range of the dry solids is 30 to 120 preferably 40 to 60 ML-4. Other components may be present but are not used in the calculation. Excellent results are obtained using a latex of a terpolymer of about 70 percent of 1,3-butadiene, 15 percent of styrene and 15 percent of a 2-vinyl pyridine, by weight, having a total solids content of around 30 to 50 percent. The terpolymer has a 4 minute Mooney viscosity of 60 ML-4. Further disclosures of rubbery vinyl pyridine terpolymer latices may be found in U.S. Pat. Nos. 2,615,826 and 3,437,122.

The heat reactable peroxides usable in the dip of the present invention have a one-hour, half-life at 110° to 160°C, and are selected from materials that are known in the art not to damage polyester fibers. Preferably the peroxide is an ester to insure its compatability with the polyester cord substrate. Peroxides which can be used include but are not limited to dicumyl peroxide, $\alpha,\alpha'$-bis(t-butylperoxy) diisopropyl benzene, 2,5-dimethyl-2,5-di(t-butylperoxy) hexane, 2,5-dimethyl-2,5-di(t-butylperoxy) hexyne-3, di-t-butyl peroxide, 1,1-bis(t-butylperoxy)-3,3,5-trimethyl cyclohexane, t-butyl perbenzoate, t-butylperoxy isopropyl carbonate, t-butyl peroxycrotonate.

The preferred peroxides include ethyl -3,3 bis (t-butylperoxy) butyrate and n butyl 4,4-bis(t-butyl-peroxy valerate).

Water is used in the dip in an amount sufficient to provide for the desired dispersion of the vinyl pyridine latex particles, solution of the RF resin and the solution or dispersion of the heat activatable peroxide and for the proper solids content to get the necessary pick-up of solids on and penetration between the fibers of the polyester cord.

The dip thus consists essentially of an aqueous dispersion of the rubbery vinyl pyridine terpolymer latex, the heat activatable peroxide, and the non-specialty reaction product of resorcinol and formaldehyde (RD); RF being present in a total amount (as dry solids, dispersed or dissolved in the water) of from about 10 to 30 parts by weight, preferably 12 to 20 parts. The range of the peroxide in the dip is from about 0.5 to 5 parts, preferably 1.0 to 3.0 parts, and the terpolymer is present at a level of from 65 to 89.5 parts, preferably 77 to 87 parts on a dry weight basis. Sufficient alkaline material is usually present from the RF resin solution to render the dip alkaline or additional alkaline material such as NaOH can be added to achieve this purpose. The function of the alkaline material is to present premature coagulation of the rubbery vinyl pyridine terpolymer.

The concentration of peroxide in the aqueous dispersion is about 0.08 to about 0.80 percent. The ratio of vinyl pyridine terpolymer to the peroxide on a dry basis is from about 100:0.5 to 100:5.0 and preferably about 100:1.0 to 100:3.0.

In order to apply the adhesive dip to the polyester cords in a reliable manner, the cords are fed through an adhesive dip bath containing the rubbery vinyl pyridine terpolymer, the RF resin and the peroxide and into a drying oven where they are dried. Also, as the cords leave the oven they enter a cooling zone where they are air cooled. In each case the adhesive-coated cords leaving the dip are dried in the oven at from about 300° to 500° F., or at a temperature below the temperature at which the polyester of the cord would lose its tensile strength, for from about 30 to 150 seconds. The time the cord remains in the dip is about a second or so or at least for a period of time sufficient to allow wetting of the cord and penetration of the fibers of the cord by the adhesive mixture.

The adhesive containing polyester reinforcing elements of this invention is preferably adhered to a vulcanized blend of natural rubber, polybutadiene rubber, and rubbery butadiene-styrene copolymer by curing the same in combination together. The adhesive containing polyester reinforcing element can also be adhered to other vulcanized conjugated diene rubber, by curing or vulcanizing the same in combination with the rubber. Examples of other conjugated diene rubbers include: nitrile rubbers, chloroprene rubbers, polyisoprenes, vinyl pyridine rubbers, acrylic rubbers, isoprene-acrylonitrile rubbers and the like and mixtures of the same. These rubbers prior to curing can be mixed with the usual compounding ingredients including sulfur, stearic acid, zinc oxide, magnesium oxide, accelerators, antioxidants, antiozonants and other curatives and the like well known to those skilled in the art for the particular rubbers being employed. Rubbers when proportions are referred to, as referred to here and in the claims, refers to the elastomer component and excludes the above compounding ingredients, e.g., a reference to a major component of the rubber being a conjugated diene polymer would refer to a major component of the elastomeric content of the composition. The rubbers referred to above are old and well known in the art and will not be described in detail here.

The major diene component of the rubber used in the practice of the present invention is a conjugated diene as opposed to a non-conjugated diene. Preferably the entire elastomeric component is conjugated diene polymer, free of ethylene/propylene/non-conjugated diene.

Polyeser fibers, yarns, filaments, cords or fabric and the like coated with the adhesive of the present invention can have from about 3 to 7 percent by weight (dry) total solids from the adhesive dip on the cord based on the weight of the undipped cord and can be used in the manufacture of radial, bias, or belted-bias passenger tires, truck tires, motorcycle and bicycle tires, off-the-road tires, airplane tires, transmission belts, V-belts, conveyor belts, hose, gaskets, rubbers, tarpaulins and the like.

The following examples will serve to illustrate the invention with more particularity to those skilled in the art. In these examples the parts and percentages are parts and percentages by weight unless otherwise indicated.

EXAMPLES I - VI

Polyester cords were dipped in the aqueous dispersion shown below and then were dried at 180°F for 150 seconds and heat treated at 440°F for 90 seconds. The dispersion of DIP I corresponds to Example I, etc. The results of physical testing of the coated cords are set forth in Table I. The composition of the DIPS is set forth following the table. Reference to how the tests were performed is set forth following the Examples.

TABLE I

| DIP | I | II | III | IV | V | VI*1 |
|---|---|---|---|---|---|---|
| Breaking Strength (lbs) | 66.6–67.6 | 66.6 | 65.2 | 67.9 | 68.9 | 65.7–67.0 |
| % Elongation at 20 lbs | 5.7– 6.0 | 5.7 | 5.7 | 5.8 | 8.7 | 5.0– 5.9 |
| % Elongation at Break | 21.0–22.0 | 20.8 | 20.5 | 21.5 | 21.6 | 18.4–21.5 |
| D.P.U. % | 4.1– 4.9 | 4.3 | 4.1 | 4.3 | — | 4.9– 5.0 |
| H-Adhesion | | | | | | |
| Room Temp. (lbs) | 40.4–45.3 | 35.6 | 30.6 | 34.8 | 7.4 | 36.1–46.7 |
| 200°F (lbs) | 30.2–40.3 | 25.1 | 28.3 | 29.3 | 4.9 | 25.7–42.0 |
| Chemstrand Strip Adhesion | | | | | | |
| Room Temp. (lbs) | 22(4)–28(7)*2 | 21(4) | 20(1) | 19(1) | Would | 23(3)–31(5) |
| 200°F (lbs) | 16(3)–20(6) | 15(1) | 15(1) | 15(1) | Not Hold | 16(2)–24(6) |
| Aged (24 hrs at 310°F) (lbs) | 20(4)–22(8) | 19(2) | 19(1) | 20(1) | Together | 20(2)–22(7) |

*1Results too inconsistent to provide a meaningful average.
*2The number in parenthesis is an appearance rating. The lowest rating is a (1) which denotes a cord to rubber failure. A (10) denotes an all rubber tear.

The preparation of DIP VI will be described first because DIP VI is the dip used in a comparative example designed to show the effect of no peroxide in the dip.

To a stainless steel vessel were added 332.4 parts of water, 1.3 parts of NaOH, 16.6 parts of resorcinol and 14.7 parts of formaldehyde.

The ingredients were mixed into the solution in the order in which they were added and the mixing or stirring was continued for two hours after the addition was complete. The temperature was maintained at 75°F.

The solution was then added with stirring to 244.0 parts of a latex containing 100.0 parts of a terpolymer containing 70 percent of 1,3-butadiene, 15 percent of styrene and 15 percent of 2-vinyl pyridine and having a 4-minute Mooney viscosity of 50. The solution is then aged for twenty-four hours. It was then stirred for fifteen minutes prior to use.

DIP I was prepared in the same way as DIP VI except that two parts of ethyl-3,3-di-(t-butylperoxy)-butyrate were added during the fifteen minutes of stirring prior to use.

DIP II was prepared in the same manner as DIP I except that 1.0 parts of the peroxide was added.

DIP III was prepared in the same manner as DIP I except that 4.0 parts of the peroxide was added.

DIP IV was prepared in the same manner as DIP I except that the peroxide was added immediately after the resorcinol-formaldehyde solution.

The peroxide added in each of the above Examples had a one-hour, half-life at 135°C.

DIP V was a control, for comparison purposes, in which no dip was used and the polyester cord was used bare.

EXAMPLES VII – X

The following examples show the effect of decreasing the amount of resorcinol-formaldehyde resin in the cord dip. The drying procedure of Example I was used.

TABLE II

| DIP | VII | VIII | IX | X |
|---|---|---|---|---|
| Break Strength (lbs) | 66.0 | 65.8 | 64.0 | 62.9 |
| % Elongation at 20 lbs | 5.5 | 5.5 | 5.3 | 5.5 |
| % Elongation at Break | 20.8 | 20.8 | 19.5 | 19.4 |
| D.P.U. % | 4.6 | 3.8 | 3.4 | 1.9 |
| H-Adhesion | | | | |
| Room Temp. (lbs) | 41.8 | 35.9 | 20.1 | 15.9 |
| 200°F (lbs) | 33.3 | 24.5 | 12.5 | 9.7 |
| Chemstrand Strip Adhesion | | | | |
| Room Temp. (lbs) | 24(2) | 20(1) | 11(1) | 9(1) |
| 200°F (lbs) | 18(1) | 13(1) | 12(1) | 9(1) |
| Aged (lbs) | 20(3) | 15(2) | 10(1) | 8(1) |

DIP VII was prepared by the following procedure:

To a stainless steel vessel was added 332.4 parts of water, 1.3 parts of NaOH, 16.6 parts of resorcinol and 14.7 parts of formaldehyde.

The ingredients were mixed into the solution in the order in which they were added and the mixing or stirring was continued for two hours after the addition was complete. The temperature was maintained at 75°F.

The solution was then added with stirring to 244.0 parts of a latex containing 100.0 parts of a terpolymer containing 70 percent of 1,3-butadiene, 15 percent of styrene and 15 percent of 2-vinyl pyridine. The solution is then aged for twenty-four hours. To the solution was added two parts of ethyl-3,3-di(-butylperoxy)-butyrate and the solution was stirred for fifteen minutes prior to use.

DIP VIII was prepared in the same manner as DIP VII except tha one-half the amounts of the resorcinol-formaldehyde solution was added and sufficient water was added to form a 20 percent solids solution.

DIP IX was prepared in the same manner as DIP VII except that one-fourth the amounts of the resorcinol-formaldehyde solution were added and sufficient water was added to form a 20 percent solids solution.

DIP X was prepared in the same manner as DIP VII except that the resorcinol-formaldehyde solution was omitted and the solids adjusted to 20 percent with water.

EXAMPLES XI – XII

The following examples show the effect of both pretreatment by the supplier of the polyester cord and applying the peroxide dip of the present invention, and of varying the peroxide in the dip of the present invention. The cord used in the following examples was polyester cord (type 1300/3) which had been coated (and dried) with a polyepoxide. The pretreated cords are commercially available from various suppliers. The cords were dried using the procedure of Example I.

DIP XI is the same as DIP VII. DIP XII is the samd as DIP XI except that the peroxide used in DIP XII was two parts of 1,1-bis(t-butylperoxy) 3,3,5-trimethylcyclohexane. This peroxide has a one-hour, half-life at 112°C.

TABLE III

| DIP | XI | XII |
|---|---|---|
| Break Strength (lbs) | 63.4 | 61.4 |
| % Elongation at 20 lbs | 4.9 | 5.2 |
| % Elongation at Break | 17.5 | 17.6 |
| D.P.U. % | 4.0 | 4.2 |
| H-Adhesion | | |
| Room Temp. (lbs) | 46.4 | 44.1 |
| 200°F (lbs) | 36.0 | 36.0 |
| Chemstrand Strip Adhesion | | |
| Room Temp. (lbs) | 29(9) | 26(8) |
| 200°F (lbs) | 25(9) | 20(8) |
| Aged (lbs) | 25(8) | 22(7) |

A brief description of the tests employed to obtain the data set forth in the above tables is as follows:

The H-adhesion test referred to above measures the static adhesion of the dried adhesive coated polyester fibers to cured rubber.

In each case the rubber test specimens are made from the same standard type rubber composition using the following recipe:

| Material | Parts by Weight |
|---|---|
| Natural rubber (No. 3 Smoked Sheet) | 46.50 |
| Butadiene-styrene rubbery copolymer, average 23.5% bound styrene, emulsion polymerized | 38.5 |
| Polybutadiene (solution polymerized BD, about 93% cis-1,4, Raw Mooney ML-4 at 212°F about 40–50) | 15.0 |
| Carbon black, high abrasion furnace (high structure) | 33.0 |
| Carbon black, fast extrusion furnace | 33.0 |
| Non-heat Reactive Phenol-Formaldehyde Resin, Tackifier, Arafene 8318, Ashland Chemical Co. | 2.5 |
| Napthenic oil, Circosol Type 2XH, Sun Oil Co. | 26.4 |
| Zinc oxide | 3.8 |
| Stearic acid | 1.5 |
| Mixture of mono, di and tristyrenated phenols, Age Rite Spar, R. T. Vanderbilt Co., Inc., antioxidant | 1.2 |
| Benzothiazyl disulfide, Altax, R. T. Vanderbilt Co., Inc., accelerator | 1.1 |
| Tetramethyl thiuram monosulfide, active ingredient, Thionex, accelerator, E. I. du Pont de Nemours & Co., Inc. | 0.1 |
| Crystex, about 80% insoluble sulfur and 20% petroleum oil, Stauffer Chemical Co. | 3.0 |

In every case the polyester cords to be treated are placed in parallel positions in a multiple-strand mold of the type described in the single-cord H-pull adhesion test designated ASTM D 2138–67, the mold is filled with unvulcanized rubber of the above composition, the cords being maintained under a tension of 50 grams each, and the rubber is cured 20 minutes at around 305°F. to the elastic state. Each rubber test specimen is ¼ inch thick and has ⅜ inch cord embedment.

After the rubber has been cured, the hot reticulate cured rubber piece is removed from the mold, cooled, and H-test specimens are cut from said piece, each specimen consisting of a single polyester cord encased in rubber and having each end embedded in the center of a rubber tab or embedment having a length of around one inch or so. The specimens are then aged at least 16 hours at room temperature. The force required to separate the cord from the rubber is then determined at room temperature or 200°F. using an INSTRON tester provided with specimen grips. The maximum force in pounds required to separate the cord from the rubber is the H-adhesion value.

The Chemstrand Strip Adhesion test involves drum-winding dipped cord at the highest possible end count so as to eliminate all rubber strike through in the subsequent preparation of the sample. A sample of the same test stock as was used in the H-adhesion test is calendered to 0.015 inch gauge and is sandwiched between two layers of the drum-wound cord. The construction is reinforced with calendered nylon square woven fabric to provide stiffness, and the resultant sample is vulcanized. The adhesion is measured as the force required to strip the test stock from the cord on a 1-inch wide sample, pulling parallel to the axial dimension of the cord at a peel angle of 180°. The strip adhesion is measured at room temperature, 200°F or after aging at room temperature.

D.P.U. percent is the amount of dip on the cord divided by the weight of the undipped cord multiplied by 100.

What is claimed is:

1. A method for adhering a polyester reinforcing element to a vulcanized conjugated diene rubber compound which comprises treating said element with a composition comprising an aqueous alkaline dispersion of from about 10 to 30 percent by weight (as dry solids) of a mixture of about 65 to 89 parts of a rubbery vinyl pyridine terpolymer containing about 50 to 95 percent of a conjugated diolefin, about 5 to 40 percent of vinyl pyridine and about 0 to 40 percent of a styrene, about 10 to 30 parts of a resorcinol-formaldehyde resin and from about 0.5 to 5 parts of a heat reactable peroxide having a one-hour, half-life at 100°–160°C. wherein the peroxide is added to the dip after the vinyl pyridine terpolymer is polymerized; heat treating said element to remove the water and to cure the solids from said composition and to deposit on said element from said composition a total of from about 3 to 7 percent by weight (solids), said heat treatment being conducted at temperatures of from about 300° to 500°F. for from about 30 to 150 seconds, cooling said treated element, combining said cooled treatment element with an unvulcanized vulcanizable rubber consisting essentially of conjugated diene as the major elastomer component, and vulcanizing the same.

2. A method according to claim 1 where said peroxide is added as the last ingredient prior to the time of treatment of said element.

3. A method according to claim 1 where said reinforcing element is a cord of linear long-chain synthetic substantially crystalline poly(ethylene terephthalate).

4. A bonded composite material comprising a polyester element embedded in a vulcanized rubber, said element containing a total of from about 3 to 7 percent by weight (dry) based on the weight of said element of an adhesive composition comprised of a deposit of a cured mixture of a rubbery vinyl pyridine terpolymer, resorcinol-formaldehyde resin and about 0.4 to about 4.0 percent based upon the dry weight of the deposit of a residue of heat reacted peroxide which had a one-hour, half-life at 110°–160°C and had been added to the adhesive composition after the polymerization of the vinyl pyridine terpolymer, said adhesive composition forming a bond between said element and said rubber.

5. A bonded composite material according to claim 4 where said peroxide is added as the last ingredient prior to the time of the adhesive composition is deposited on the polyester element.

6. A bonded composite material according to claim 5 where said element is a cord of linear long-chain synthetic substantially crystalline poly(ethylene terephthalate).

7. A bonded composite material according to claim 4 where said rubbery vinyl pyridine terpolymer is a terpolymer of about 70 percent by weight of 1,3-butadiene, 15 percent by weight of styrene, and 15 percent by weight of 2-vinyl pyridine and where the parts by weight ratio of said rubbery vinyl pyridine terpolymer to said peroxide composition is from about 100:1.0 to 100:3.0.

8. A bonded composite material according to claim 7 where said element is a cord of linear long-chain synthetic substantially crystalline poly(ethylene terephthalate).

9. A composition consisting essentially of an aqueous alkaline dispersion of a minor amount by weight of a mixture of a rubbery vinyl pyridine terpolymer, a resorcinol-formaldehyde resin and from about 0.08 to about 0.80 percent based upon the aqueous composition of a heat reactable peroxide having a one-hour, half-life at 110°–160°C. which peroxide is added to the composition after the vinyl pyridine terpolymer is polymerized.

10. A composition according to claim 9 in which said peroxide is added as the last ingredient.

11. A composition according to claim 10 in which said terpolymer is a terpolymer of from about 60 to 80 percent by weight of 1,3-butadiene, 10 to 30 percent by weight of styrene and 10 to 30 percent by weight of 2-vinyl pyridine, and where said peroxide is an ester.

12. A composition according to claim 11 in which the ratio by parts of said terpolymer to said peroxide composition is from about 100:1.0 to 100:3.0.

13. A composition according to claim 12 in which said terpolymer is a terpolymer of about 70 percent by weight of 1,3-butadiene, 15 percent by weight of styrene and 15 percent by weight of 2-vinyl pyridine.

* * * * *